(12) United States Patent
Kazanci

(10) Patent No.: US 12,380,516 B2
(45) Date of Patent: Aug. 5, 2025

(54) FLUID FLOW CONTROL SYSTEM COMPRISING EXERGY-BASED OPTIMAL OUTPUT

(71) Applicant: Deniz Kazanci, Istanbul (TR)

(72) Inventor: Deniz Kazanci, Istanbul (TR)

( * ) Notice: Subject to any disclaimer, the term of this patent is extended or adjusted under 35 U.S.C. 154(b) by 860 days.

(21) Appl. No.: 16/627,381

(22) PCT Filed: Jun. 28, 2018

(86) PCT No.: PCT/TR2018/000061
§ 371 (c)(1),
(2) Date: Dec. 30, 2019

(87) PCT Pub. No.: WO2019/125315
PCT Pub. Date: Jun. 27, 2019

(65) Prior Publication Data
US 2021/0081864 A1  Mar. 18, 2021

(30) Foreign Application Priority Data
Jun. 30, 2017  (TR) .................................. 2017/09660

(51) Int. Cl.
*G06Q 50/06* (2024.01)
*F24S 50/40* (2018.01)

(52) U.S. Cl.
CPC .............. *G06Q 50/06* (2013.01); *F24S 50/40* (2018.05)

(58) Field of Classification Search
CPC .......... G06Q 50/06; F24S 50/40; F24S 90/00; F24S 50/00; Y02E 10/40; Y02P 80/20; F24D 11/003; F24D 19/1042; Y02B 10/20
See application file for complete search history.

(56) References Cited

U.S. PATENT DOCUMENTS 4,378,908 A * 4/1983 Wood .................. F24D 11/0221
                                                            62/235.1
8,813,742 B2 * 8/2014 Kanai ................... F24D 11/003
                                                            417/42

(Continued)

FOREIGN PATENT DOCUMENTS

| CN | 104196689 A | * | 12/2014 |
| EP | 2 610 693 A1 | | 7/2013 |
| WO | WO 2009/053923 A2 | | 4/2009 |

OTHER PUBLICATIONS

International Search Report and Written Opinion of the International Searching Authority, mailed Dec. 30, 2019, Corresponding to PCT/TR2018/000061, 6 pages.

*Primary Examiner* — Kun Kai Ma
(74) *Attorney, Agent, or Firm* — Womble Bond Dickinson (US) LLP

(57) ABSTRACT

The present invention pertains to a fluid-flow control system (O) that renders an exergy-based optimal output based on the maximization of the total exergy at any given time via control, and suffices an innovative, exergy-based purpose function which instantly optimizes flow in/into any system (S) of power and/or heat generation, industrial or all kinds of manufacturing systems where liquid, gas, and/or one or more phases of fluid is/are involved. Systemic, environmental, technical factors such as equipment performance, losses, demand/supply inputs, temperature and pressure data are considered within the optimization system with the particular help of instrumentation and data control units, and flow control units such as the variable flow/displacement pumps.

13 Claims, 1 Drawing Sheet

(56) References Cited

U.S. PATENT DOCUMENTS

| | | | |
|---|---|---|---|
| 2010/0252029 A1* | 10/2010 | Kanai | F24H 15/219 |
| | | | 126/643 |
| 2010/0314238 A1* | 12/2010 | Frolov | C02F 1/14 |
| | | | 203/10 |
| 2011/0081255 A1 | 4/2011 | Steger et al. | |
| 2013/0152914 A1* | 6/2013 | Martinez-Val Penalosa | ............... |
| | | | F24S 23/80 |
| | | | 126/600 |
| 2013/0238158 A1* | 9/2013 | Gan | G06Q 10/04 |
| | | | 700/295 |
| 2018/0313595 A1* | 11/2018 | Rezayat | F25D 13/02 |
| 2019/0003383 A1* | 1/2019 | Garvey | F02C 6/16 |

* cited by examiner

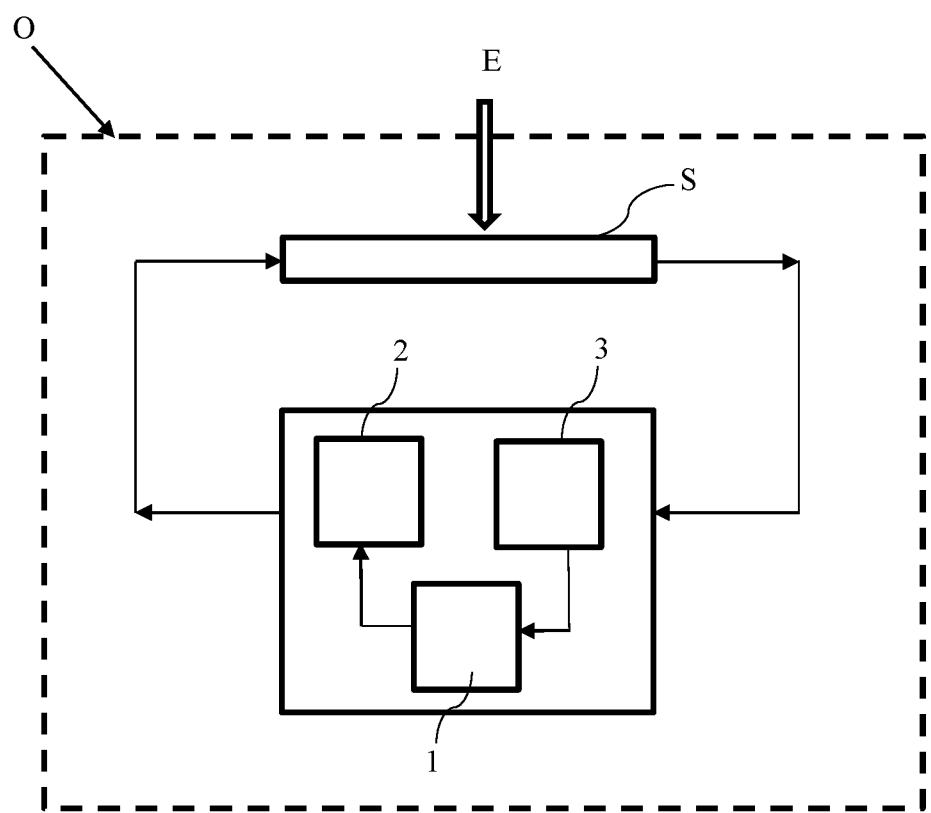

FLUID FLOW CONTROL SYSTEM COMPRISING EXERGY-BASED OPTIMAL OUTPUT

CROSS-REFERENCE TO RELATED APPLICATION

This application is a national stage application, filed under 35 U.S.C. § 371, of International Patent Application No. PCT/TR2018/000061, filed on Jun. 28, 2018, which is incorporated by reference herein in its entirety.

BACKGROUND OF THE INVENTION

Technical Field

The present invention pertains to a fluid-flow control system that renders an exergy-based optimal output based on the maximization of the total exergy at any given time via control, and suffices an innovative, exergy-based purpose function which instantly optimizes flow in/into any system of power and/or heat generation, industrial or all kinds of manufacturing systems where liquid, gas, and/or one or more phases of fluid is/are involved. Systemic, environmental, technical factors such as equipment performance, losses, demand/supply inputs, temperature and pressure data are considered within the optimization system with the particular help of instrumentation and data control units, and flow control units such as the variable flow/displacement pumps.

Previous Technique

For instance, today, no solution exists in current market to meet the requirements of constant optimization of fluid flow parallel with the changing conditions and to eliminate the low aggregate exergy efficiency problem encountered in solar energy-based combined power and heat systems. To further clarify the problem, according to the First Law of Thermodynamics, the efficiency level of a photovoltaic (PV) panel system at an irradiation of 800 W/m$^2$ is around 0.20 points. According to the Second Law, the efficiency is at most at a 0.36 level. Alternatively, current photovoltaic technology can convert only 20% of the solar irradiation reaching the panels into electric power. Moreover, in practice, thermoelectric conversion efficiencies of photovoltaic systems are further reduced with the increase in temperature of photovoltaic cells. For this reason, in hot climates, in the summer season when the demand for electric power for comfort cooling is at its highest, the dilemma further escalates and results in a deadlock. On the environmental impact side, if the contribution of the planar collector to the reduction in $CO_2$ emission is taken as "1", then the effect of the photovoltaic panels on the reduction of $CO_2$ emission is considered as "1.62."

In the prior art, the problem—of the First-Law-efficiency of the photovoltaic panel being further reduced due heat—is attempted to be overcome by cooling the panel. Such situation brought with it the idea of simultaneous hot water production along with electricity generation and as a result the photo-voltaic thermal system was designed. The aim in such a system is to increase power generation capacity by cooling while trying to perform heat recovery. Compared to the 0.20 and 0.36 point-efficiency of the photovoltaic system, with a combined heat and power concept such as a photovoltaic thermal panel the total heat and power output generated in the system results in respectively for the First and Second Law efficiencies of 0.92 and 0.58 theoretically. That means that a photovoltaic thermal panel at an efficiency of 0.92 can deliver 68% of the total irradiation reaching the panel into useful heat and 28% into electric power. Yet such levels has not yet been accomplished in practice with available technology. In this context, the contribution of the photovoltaic thermal technology to $CO_2$ emission reduction is calculated at a level of 7.31 as compared to that of a planar collector.

A trade-off, waiving the goal of achieving power generation efficiency as the cooling of the circulated coolant is allowed to obtain useful heat from the system may arguably be shown as a drawback. Furthermore, due to the high heat-susceptibility of the panel's core production materials, increasing temperature levels increasingly reduce power generation efficiency creating a dilemma concerning the existing photovoltaic thermal (PVT) systems. Such controversies occur between decisions of cooling the PVT panels and only pre-heating the fluid prior to heating, or warming the coolant fluid for heating purposes and having the photovoltaic panel efficiency drop too low down to ineffective or even negative domain.

As a result, the expected maximum total useful energy cannot yet be obtained from total power and heat output in photovoltaic thermal systems. Furthermore, the presence of the circulation pump means a parasitic power loss. Besides, due to legionnaires' disease—unfamiliar to most in the society—the need to heat the lukewarm water up even further, often leads to a higher parasitic power loss. Unfortunately, such parasitic losses, power consumed by circulation pump and other system components is often not reported in performance analyses. Hence forth, actual net productivity amounts may be far below than those provided by the photovoltaic panel manufacturers, or even at the negative domain. In that case, convergence of the harvest ratio of useful energy to that of a photovoltaic panel or reaching a 20% efficiency level does not seem to be probable.

As heat-susceptible photovoltaic panel material reduces equipment capacity to lower levels, even a comprehensive feasibility analysis may not actualize as is foreseen. On the other hand, if the circulating fluid is tried to be kept cold, recovery of useful heat may not be realized, and the photovoltaic thermal system may lose its characteristic turning into a high efficiency photovoltaic panel with the cooling system. In addition, since the circulation pump draws electricity from the system, as the stability for photovoltaic efficiency of the system is ensured, the system may not be able to pay off the pump costs in many cases. Such situations may be particularly be observed in applications where photovoltaic panels are implemented with heat pumps to produce heat and power.

Therefore, existing photovoltaic thermal systems are not really functional in two main ways. Firstly, the power required to circulate the coolant through a pump may generally be greater than the power gain obtained by cooling the photovoltaic panel. Secondly, keeping the fluid temperature aloof in order to effectively cool the photovoltaic panel is neccessitated. On the other hand, circulation of lukewarm fluid within the system reduces the usefulness of the system that is originally designed to produce hot water. Due to these reasons, and since all systemic data, environmental conditions such as solar irradiation, technical factors as photovoltaic panel temperature and equipment performance, losses, supply/demand inputs, temperature and pressure factors can change instantly, the net total exergy—the electric and heat output—of the system needs to be optimized every second, In the prior art, methodology for resolving such problem has not been introduced so far.

Moreover, in any kind of system and process involving both heat and electric power generation, due to the fact that the exergies of electricity and heat differ from each other in its entirety, even an optimization performed based only on the First Law of Thermodynamics considering quantity of energy will not be sufficient for efficient production and/or utilization of energy. Within the scope of the Second Law of Thermodynamics, taking into account of the exergy differences, a methodology for optimizing the total net energy quality, total net system exergy output, based on the fact that in systems involving fluid, the outputs have different exergies and energy qualities, has never been proposed so far.

Within the same context, a solution to ensure exergy-based system optimization in industrial or other production systems that involve a fluid (and a temperature differential) does not exist. Since all the related systemic data, environmental conditions, technical factors as equipment performance, losses, supply/demand inputs, temperature and pressure factors can change instantly, the net total output of the system needs to be optimized each and every second via circulation of a fluid. In the prior art, methodology for resolving such problem has not been encountered.

SUMMARY OF THE INVENTION

The objective of the present invention is to provide a fluid-flow control system that instantaneously renders an exergy-based optimal output based on the maximization of the total exergy at any given time via control, and suffices an innovative, exergy-based purpose function which optimizes flow instantly in any system of power and/or heat generation, industrial or all kinds of manufacturing where liquid, gas, and/or one or more phases of fluid is/are involved. The optimization system considers systemic, environmental, technical factors such as equipment performance, losses, demand/supply inputs, temperature and pressure data with the particular help of instrumentation and data control units, and flow control units such as a variable flow/displacement pumps.

Another objective of the invention is to realize a fluid-flow control system that renders an exergy-based optimal output which provides optimal production/consumption efficiency and optimal net total production output in any system where liquid, gas, and/or one or more phases of fluid process is involved.

Another objective of the invention is to realize a fluid-flow control system that renders an exergy-based optimal output, which ensures maximum level of net total power and/or heat generation in any solar energy system where liquid, gas, and/or one or more phases of fluid process is/are involved.

Another objective of the invention is to realize a fluid-flow control system that renders an exergy-based optimal output, which ensures maximum level of exergy and/or energy efficiency along with changing conditions via providing optimal instant flow of fluid that circulates in between flow control unit and energy demand point, primarily in solar energy, wind energy, other renewables and even fossil fuel based production, industrial and all types of production systems or grid electricity driven all kinds and sourced flow control units, for example all types and sources of heat pumps.

Another objective of the invention is to realize a fluid-flow control system that renders an exergy-based optimal output, which ensures maximum efficiency in any industrial system or systems comprising all types of manufacturing and processes where liquid, gas, and/or one or more phases of fluid process is involved.

Another objective of the invention is to realize a fluid-flow control system that renders an exergy-based optimal output, providing maximum level of carbon emission reduction in addition to optimal power/heat generation and efficiency increase in power and/or heat generation or industrial production.

Another objective of the invention is to realize a fluid-flow control system that renders an exergy-based optimal output, sufficing not merely an equipment level optimization, but the optimization of the entire system in industrial system or systems comprising all types of manufacturing and processes where liquid, gas, and/or one or more phases of fluid process is/are involved.

BRIEF DESCRIPTION OF THE DRAWING

To achieve the objective of the present invention, "a fluid flow control system comprising exergy-based optimal output" is shown schematically in the attached FIGURE;

FIG. 1. The schematic view of the system with the objective of a fluid flow control system comprising exergy-based optimal output.

Components partaking in the FIGURE are each numbered separately, and the corresponding definitions for each number are provided below.

Optimization system sufficing exergy-based objective function

Flow control unit

Measurement and data management unit

S: Power and/or heat, industrial or all types of production systems, where liquid, gas, and/or one or more phases of fluid process is/are involved, such as solar powered PVT system, industrial waste, cogeneration or other power generation systems O: Fluid flow control system comprising exergy-based optimal output E: Total of energy or energies with exergy breakdown as system inputs

DETAILED DESCRIPTION OF THE INVENTION

A fluid flow control system (O) comprising exergy-based optimal output, with the objective of the invention which ensures that the objective function, for instance, exergy efficiency or exergy rationalism or composite function, remains at the maximum point within the system, and prevents the efficiency from falling into the negative domain, at least one flow control unit (2) to pump the fluid into the system in any type of power and/or heat, industrial or production systems (S), where liquid, gas, and/or one or more phases of fluid process is/are involved, at least one measurement and data management unit (3) that is connected to inlet and outlet points of at least one flow control unit (2), and measures, transfers and performs data management of the flow rate, temperature, pressure values of the fluid that passes through the flow control unit (2), and comprises an optimization system sufficing at least one exergy-based objective function (1), instantaneously optimizing the flow rate and the difference between the input and output temperatures of the fluid that circulates so as to increase the performance of the power and/or heat, industrial or all types of production systems (S), where liquid, gas, and/or one or more phases of fluid process is/are involved.

Optimization system sufficing exergy-based objective function (1) is an algorithm-based driver that interprets instantaneous data and determines the fluid flow rate at each instant. Such algorithmic system (1) ensures that the ratio of the total and exergy breakdown of each energy output delivered by the fluid flow control system comprising exergy-based optimal output (O), with respect to the total and exergy breakdown of each energy input into the fluid flow control system comprising exergy-based optimal output, is at maximum at each instant. Whenever needed or at discretion, such system (1) is capable of functioning in accordance with only the First Law of Thermodynamics, economic data, Second Law of Thermodynamics or a composite function where each is taken into account at a specific weight, or another constraint.

The flow control unit (2) is the unit that delivers the optimum fluid flow rate with the command of the optimization system sufficing exergy-based objective function (1).

Measurement and data management unit (3) is the measurement, data transfer and management unit comprising of more than one instrumentation device. Depending on the system, the measurement and data management units measure all relevant systemic parameters as power input, environmental conditions, technical factors as equipment performances, losses and supply/demand inputs, temperature, pressure, flow rate and similar factor data electronically; and prepares and feeds essential commands into the relevant points In the solar energy application of the invention, the optimization system sufficing exergy-based objective function (1) allows coolant fluid in the power and/or heat generation system (S) to warm up only until a certain level of temperature with the goal of sufficing the low operating temperature necessities and the cooling needs of the PV cells heating under the sun, generating electric power preferably by preserving the design capacity. Current PV panel technology data indicate an average maximum temperature level of 75° C., however, such levels remain too high for systems where primary objective is to preserve the PV power production capacity. In order to maintain the PV capacity, the fluid supply temperature must be as low as possible. In that case, the output temperature of the fluid can generate a trace of exergy that can be used only as a pre-heating mechanism as is already mentioned in some product specifications.

Within the invention objective, a fluid flow control system comprising exergy-based optimal output (O); the optimization system sufficing exergy-based objective function (1) that constantly regulates the difference between inlet and outlet temperatures of circulating fluid, $\Delta T$ (delta T), and controls the fluid flow rate of the flow control unit (2) in power and/or heat, industrial or all types of production systems (S), where liquid, gas, and/or one or more phases of fluid process is/are involved. In the preferred application, the optimization system sufficing exergy-based objective function (1) controls the variable-speed flow control unit (2). The optimization system sufficing exergy-based objective function (1), works on the supply-demand temperature and flow rate constraints of the fluid that is at gas, liquid and/or in another phase. Hence, maximum level of net total efficiency/power/heat outputs are delivered due to the optimization system sufficing exergy-based objective function (1).

Within the invention objective, a fluid flow control system comprising exergy-based optimal output (O); the optimization system sufficing exergy-based objective function (1) supplies variable flow rate. In addition to maintaining the design capacity of the power and/or heat, industrial or all types of production systems, where liquid, gas, and/or one or more phases of fluid is/are involved, rational utilization of resources as well as the maximum net total system output are endeavoured. The invention objective, a fluid flow control system comprising exergy-based optimal output (O), the optimization system sufficing exergy-based objective function (1) optimizes flow rate of the fluid that is in liquid, gas, and/or one or more phases based on supply-demand temperature, flow rate constraints, instant load profiles, solar irradiation in solar power generation systems, and environmental conditions.

Within the invention objective, a fluid flow control system comprising exergy-based optimal output (O); the optimization system sufficing exergy-based objective function (1), with a baseline for total exergy maximization, ensures that the power and/or heat, industrial or all types of production systems (S), where liquid, gas, and/or one or more phases of fluid process is/are involved, operate optimally via supply of variable flow.

Within the invention objective, a fluid flow control system comprising exergy-based optimal output (O), the optimization system sufficing exergy-based objective function (1), aims to optimize the net total exergy output as the objective function (For instance, Objective Function=Maximum Net Total Exergy Output). In solar energy systems, the optimization system sufficing exergy-based objective function (1) calculates the objective function as the maximization of the difference between total exergy output of the power and/or heat, industrial or all types of production systems (S) and the total exergy consumed by the components of the production system (For instance, Objective Function=max (total exergy output generated by the power/heat production system−total exergy consumed)). Variables in aforementioned formulation are dependant on time, and all variables are related to the flow rate of the fluid. Hence, optmization in the invention is realized supersensitively as a fluid flow rate by a single point of control and is based on exergy. Pertaining to the invention, the optimization system sufficing exergy-based objective function (1) performs the necessary calculations and determines instant optimum fluid flow rate while the flow control unit (2) controls the instant flow rates.

With the present invention objective, a fluid flow control system comprising exergy-based optimal output (O); proceeding objectives are delivered as separate objectives each or all together at once or as a composite objective of selected portion of few;

maximum total power output or maximum net total power output, or maximum total heat output or maximum net total heat output, or maximum total power and heat output or maximum net total power and heat output, or maximum total power exergy output or maximum net total power exergy output, or maximum total heat exergy output or maximum net total heat exergy output, or maximum total exergy output or maximum net total exergy output, or maximum energy output or maximum net energy output, or maximum total power generation/consumption efficiency or maximum net total power generation/consumption efficiency, or maximum total heat generation/consumption efficiency or maximum net total heat generation/consumption efficiency, or maximum total power and heat generation/consumption efficiency or maximum net total power and heat generation/consumption efficiency, or maximum total production efficiency or maximum net total production efficiency, or maximum net total profit output in industrial production and/or heat generation, or maximum net total exergy and profit output in industrial production and/or heat generation, or maximum net total energy and profit output and/or obtainment of maximum contribution to carbon emission reduction by system efficiency optimization in industrial production and/or heat generation.

The invention objective is, with a fluid flow control system comprising exergy-based optimal output (O), to ensure that efficiency in power and/or heat, industrial or all types of production system remains at maximum and does not fall into the negative domain.

Around such basic concepts, developing wide variety of applications for the invention objective "a fluid flow control system comprising exergy-based optimal output (O)" is possible; the invention, the optimization system sufficing exergy-based objective function (1) can not be limited to embodiments described herein, is essentially as specified within the claims.

The invention claimed is:

1. A system, comprising:
   a fluid flow control unit;
   a sensor; and
   an optimization system connected to the fluid flow control unit and to the sensor,
   wherein the optimization system is configured:
      to cause the fluid flow control unit to adjust the flow of a fluid through the system to maximize an exergy delivered by the system, and
      to calculate the exergy delivered by the system as the difference between the exergy generated by the system and the exergy consumed within the system.

2. The system of claim 1, wherein the sensor is configured to measure a difference between a fluid temperature at a first point of the system and a fluid temperature of a second point of the system.

3. The system of claim 2, wherein the sensor is configured to measure a fluid pressure at at least one point of the system.

4. The system of claim 3, wherein the sensor is configured to measure a fluid flow at at least one point of the system.

5. The system of claim 1, wherein the sensor is configured to measure a fluid flow at at least one point of the system.

6. The system of claim 1, wherein the optimization system is configured to maximize the exergy delivered by the system subject to fluid flow-rate constraints.

7. The system of claim 1, wherein the optimization system is configured to maximize the exergy delivered by the system subject to demand-supply temperature constraints.

8. The system of claim 1, wherein the optimization system is configured to maximize the exergy delivered by the system subject to instant load profiles.

9. The system of claim 1, wherein the optimization system is configured to maximize the exergy delivered by the system subject to inlet or outlet pressure or temperature constraints.

10. The system of claim 1, wherein the optimization system is configured to maximize the exergy delivered by the system subject to an environmental constraint selected from the group consisting of wind and solar radiation.

11. The system of claim 1, wherein the maximizing comprises calculating an objective function.

12. The system of claim 1, wherein the optimization system is configured to ensure that an efficiency does not fall into the negative domain.

13. The system of claim 1, further comprising a photovoltaic thermal panel.

* * * * *